United States Patent
Lee (10) Patent No.: US 7,020,056 B2
(45) Date of Patent: Mar. 28, 2006

(54) METHOD FOR MANAGING SPARE BLOCKS OF AN OPTICAL DISC

(75) Inventor: Ming-Hung Lee, Taipei Hsien (TW)

(73) Assignee: Media Tek Inc., Hsin-Chu (TW)

( * ) Notice: Subject to any disclaimer, the term of this patent is extended or adjusted under 35 U.S.C. 154(b) by 387 days.

(21) Appl. No.: 10/065,767

(22) Filed: Nov. 18, 2002

(65) Prior Publication Data

US 2004/0004917 A1 Jan. 8, 2004

(30) Foreign Application Priority Data

Jul. 4, 2002 (TW) .............................. 91114881 A (51) Int. Cl.
*G11B 7/0045* (2006.01)

(52) U.S. Cl. .................................. 369/47.14; 369/53.17

(58) Field of Classification Search ............. 369/47.14, 369/53.12, 53.13, 53.15, 53.17

See application file for complete search history.

(56) References Cited

U.S. PATENT DOCUMENTS

| 4,774,700 | A | * | 9/1988 | Satoh et al. | 369/47.14 |
| 4,984,230 | A | * | 1/1991 | Satoh et al. | 369/53.17 |
| 5,132,956 | A | * | 7/1992 | Ichikawa | 369/53.17 |
| 5,271,018 | A | * | 12/1993 | Chan | 369/30.07 |
| 5,319,627 | A | * | 6/1994 | Shinno et al. | 369/47.14 |
| 5,715,221 | A | * | 2/1998 | Ito et al. | 369/47.14 |
| 6,408,408 | B1 | * | 6/2002 | Ko | 369/53.17 |
| 6,453,384 | B1 | * | 9/2002 | Park et al. | 369/53.17 |

FOREIGN PATENT DOCUMENTS

JP 2000-339874 12/2000

\* cited by examiner

*Primary Examiner*—Brian E. Miller
*Assistant Examiner*—Peter Vincent Agustin
(74) *Attorney, Agent, or Firm*—Winston Hsu (57) ABSTRACT

A method for defect management of an optical disc. The optical disc includes a plurality of data blocks and a plurality of spare blocks, each data block is for recording data, each spare block is for replacing a defect data block to record a data. The method includes recording a status of the spare blocks in a status table according to a location order of the spare blocks, such that the statuses of neighboring spare blocks with different statuses are recording in neighboring items of the status table.

12 Claims, 9 Drawing Sheets

METHOD FOR MANAGING SPARE BLOCKS OF AN OPTICAL DISC

BACKGROUND OF INVENTION

1. Field of Invention

A method for managing the spare blocks of an optical disc, more particularly one based on using the spare block address to access the spare block usage status.

2. Description of the Prior Art

Because an optical disc is inexpensive, compact, light in weight, and can store a huge amount of data, optical discs are becoming the most frequently used data storage media in the modern information society. With the introduction of a writable optical disc allowing each user to write his or her own data onto the optical disc to meet personal needs, the optical disc is becoming one of the most important portable personal storage media. How to access data on the writable optical disc more reliably and more efficiently is now a focal point of research in the modern information industry.

Figure 1:
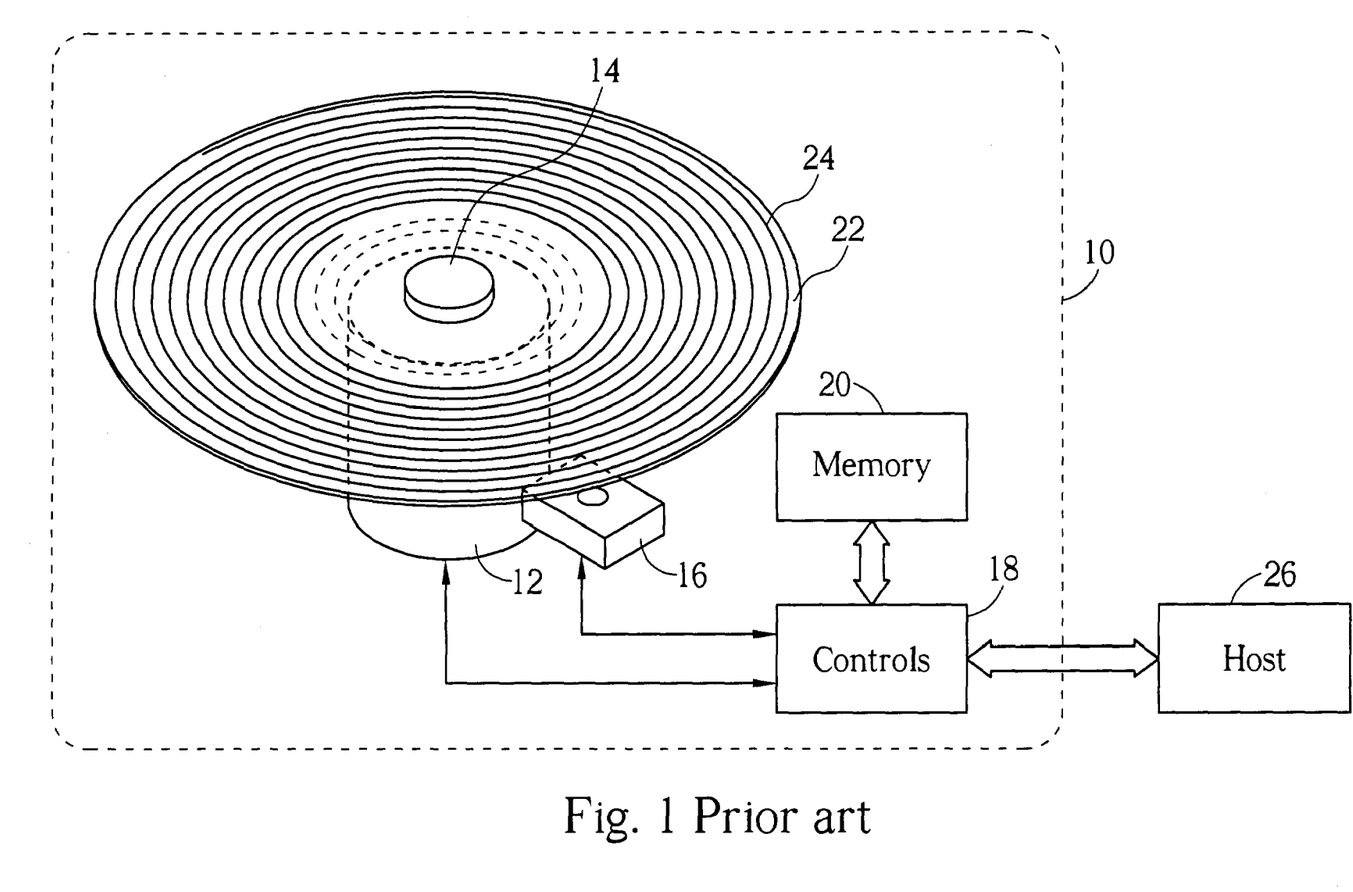
FIG. 1 is a functional block diagram of a prior art optical disc drive.

An optical disc drive is necessary to access data on the optical disc. Please refer to FIG. 1. FIG. 1 is a functional block diagram of a typical optical disc drive 10 that is used to access an optical disc 22. There is a loader 14 to hold the optical disc 22 in the optical disc drive 10, one motor 12 that spins the loader 14, a control circuit 18 that controls operation of the optical disc drive 10, and a memory 20 (such as a volatile random access memory) to temporarily hold the data needed by the controlling circuit 18 during an operational period. The optical disc 22 has tracks 24 to record data. After the optical disc 22 is put on the loader 14, the motor 12 will drive the loader 14 and the tracks 24 on the optical disc 22 will rotate across a pick-up head 16. Using the pick-up head 16, the control circuit 18 can access the data on the tracks 24. The control circuit 18 is controlled by a host 26 to access data on the optical disc 22. The host 26 can be a computer system such as PC.

To make the recording of data onto the optical disc 22 more reliable, there is a certain defect management mechanism in more advanced optical disc specifications. One of the most common ways is to allocate a portion of the optical disc 22 as a spare recording area. Whenever there are defects on an optical disc that make recording impossible, the data that is supposed to be recorded in the defective area will then be recorded in the spare recording area instead. Thus, the defects will not affect the recording of data on the optical disc 22.

Figure 2:
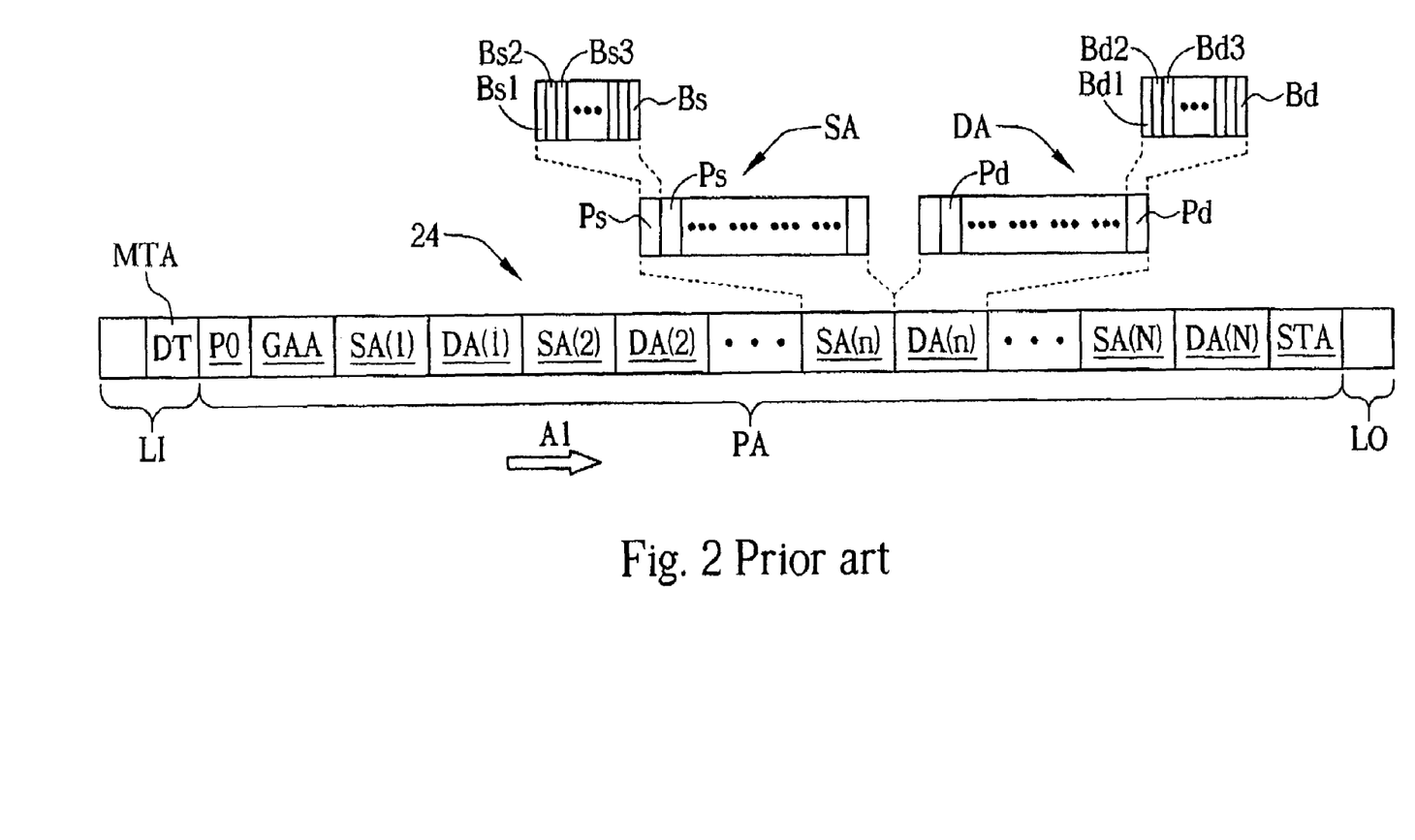
FIG. 2 is a sketch map of the data format on an optical disc track.

Please refer to FIG. 2. FIG. 2 shows the allocation of spare recording areas and normal recording areas under the specification of CD-MRW(Compact Disc-Mount Rainier reWritable). As shown in FIG. 2, the track 24 that is used for data recording is divided into several major areas. These areas include a Lead-In Area (LI), a Program Area (PA), and a Lead-Out Area (LO). The LI and the LO are used respectively for marking the beginning and the end of the tracks 24. The LI comprises one area as a Main Table Area (MTA) to store a Defect Table (DT). The PA is used to record data. The PA is divided into a pre-gap (P0), a General Application Area (GAA), a Secondary Table Area (STA) to store a backup copy of the defect table DT, a plurality of Data Areas (DA), and a plurality of Spare Areas (SA).

In FIG. 2, different Data Areas (DA) are marked as DA(1), DA(2), . . . all the way to DA (N). There is also a plurality of Spare Areas (SA) in the PA to match the DA, different SA are marked with SA(1), SA(2), . . . to SA(N) respectively. Every DA has a plurality of Data Packet Areas (Pd). Every Pd has a plurality of user data blocks (Bd). Every Bd is used to record one block of data. Similarly, every SA(n) is further divided into a plurality of Spare Packet Areas (Ps). Every Ps comprises a plurality of spare data blocks (Bs). To facilitate discussion later on, there are three data blocks specifically marked Bd1, Bd2, and Bd3 and another three spare blocks specifically marked Bs1, Bs2, and Bs3 shown in FIG. 2. Whether it is the data block Bd or spare the block Bs, they are all writable data blocks with the same data storage capacity. For instance, in the specification of CD-MRW, every data area DA generally has 136 Pd and every packet Pd has 32 user data blocks Bd, every spare area SA has 8 packets Ps and every packet Ps has 32 spare blocks Bs. Every user data block Bd and spare area Bs contains room for 2 k bytes of data respectively.

In order to manage these data blocks Bd and spare blocks Bs, every data block Bd and spare block Bs has its own address (i.e. PBN, Physical Block Number). On the track 24, the address of each data block Bd and spare block Bs is unique. The value of each address corresponds to the physical order of the Bd, Bs on the track 24. An arrow A1 in the FIG. 2 points from the left to the right, the data area Bd on the left hand side has smaller address value. For example, in FIG. 2, the address value of the data area Bd is smaller than the address value of the data area Bd2 and the address value of data area Bd2 is smaller than that of Bd3, etc. The address value of every data block Bd in the data area DA(1) is smaller than the address value of a data block Bd in the data area DA(2), etc. Similarly, the address value of a spare block Bs1 is smaller than that of Bs2 and the address value of spare block Bs2 is smaller than that of Bs3. The address value of every spare block Bs in the spare area SA(1) is smaller than the address value of every spare block in the spare area SA(2).

We can describe the basic principle of the optical disc 22 defect management as follows. Whenever the optical disc drive 10 needs to write data from the host 26 (refer to FIG. 1) to the optical disc 22, the optical disc drive 10 will first write data onto a data block Bd(i) of the track 24. If the optical disc drive 10 encounters a defect and can not record data to the data block Bd(i) correctly, the optical disc drive 10 will find a substitute spare block Bs and write the data that was meant to be in this defective data block Bd(i)into the substitute spare block Bs.

In practice, the address of every defective data block Bd, the address of the substituted spare block Bs, and a mapping indicating the relationship is recorded in the defect table DT of the optical disc 22. When the optical disc drive 10 wants to read from the optical disc 22 and reaches the defective data block Bd, it locates the corresponding substituted spare block Bs via a record in the defect table DT, and reads the data on this substituted spare block Bs. According to the operational principle described above, even with some defects on the optical disc 22(caused by scratches or microdust), by setting up and using spare blocks Bs to implement defect management via the defect table DT, data can still be recorded on the optical disc 22.

Figure 3:
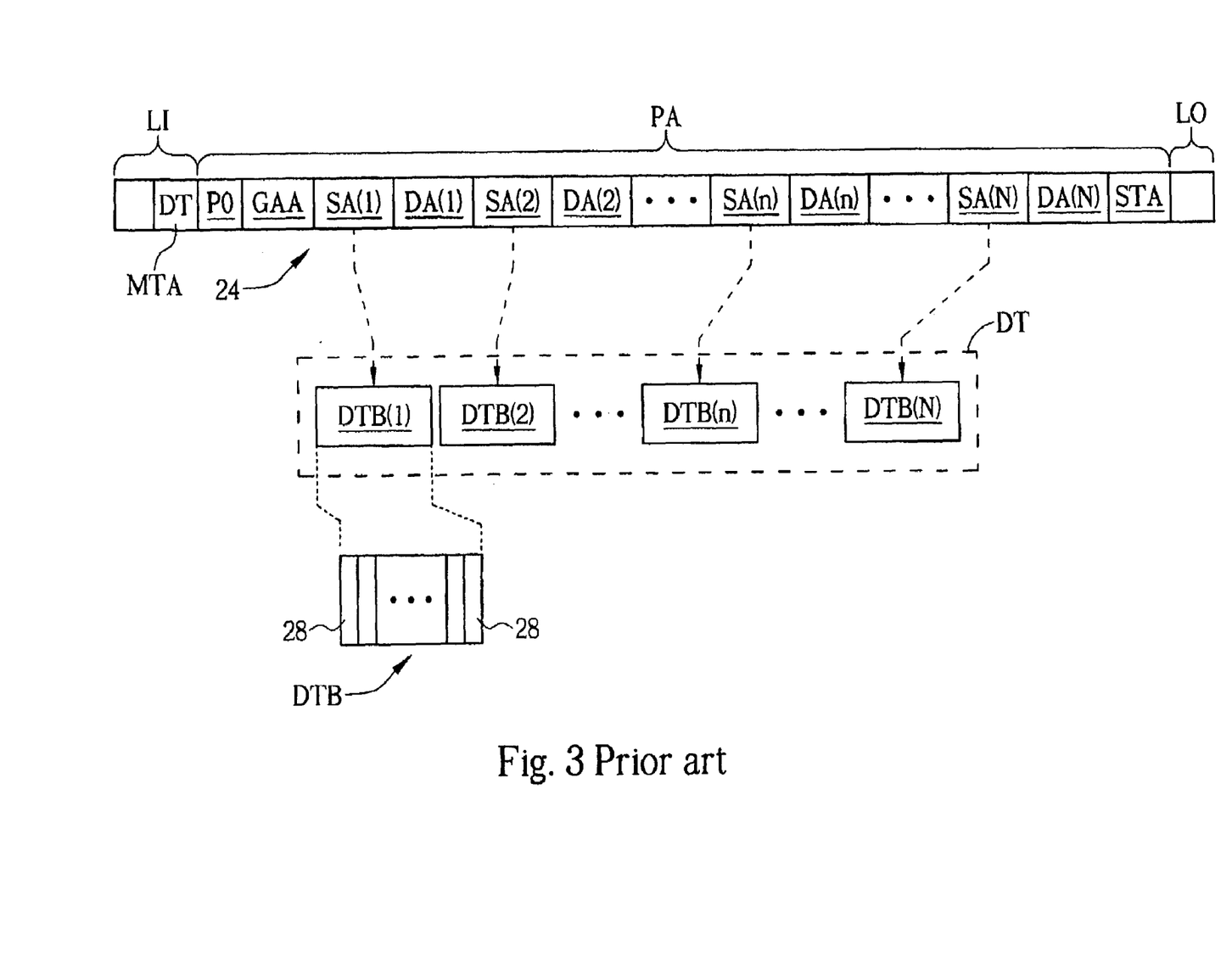
FIG. 3 is a sketch map of the main data structures of a defect table of the optical disc track in FIG. 2.

As described above, the defect table DT records the usage status of each spare block Bs. Please refer to FIG. 3. FIG. 3 is a sketch map of the main data structure of the defect table DT in FIG. 2. The defect table DT has a plurality of Defect Table Blocks (DTB) (different Defect Table Blocks are marked DTB(1), DTB(2) . . . respectively). Each DTB has a plurality of entries 28. A plurality of DTB can be collected to form one defect table packet, so the DTB in the defect table DT can be divided into a plurality of defect table packets.

The total number of DTB in the defect table DT is the same as the number of spare areas SA in the track 24. The number of entries 28 in each DTB is the same as the number of the allocated spare blocks Bs in the spare area SA. In other words, every entry 28 in the defect table DT maps to one spare block Bs and records the usage status of this spare block Bs. Basically, each DTB maps to one spare area SA and every entry 28 of DTB is used to record the usage status of one spare block Bs in the corresponding spare area SA. However, in some special cases, there will be some entries 28 in the DTB that record a spare block Bs usage status of another spare area SA.

Figure 4A:
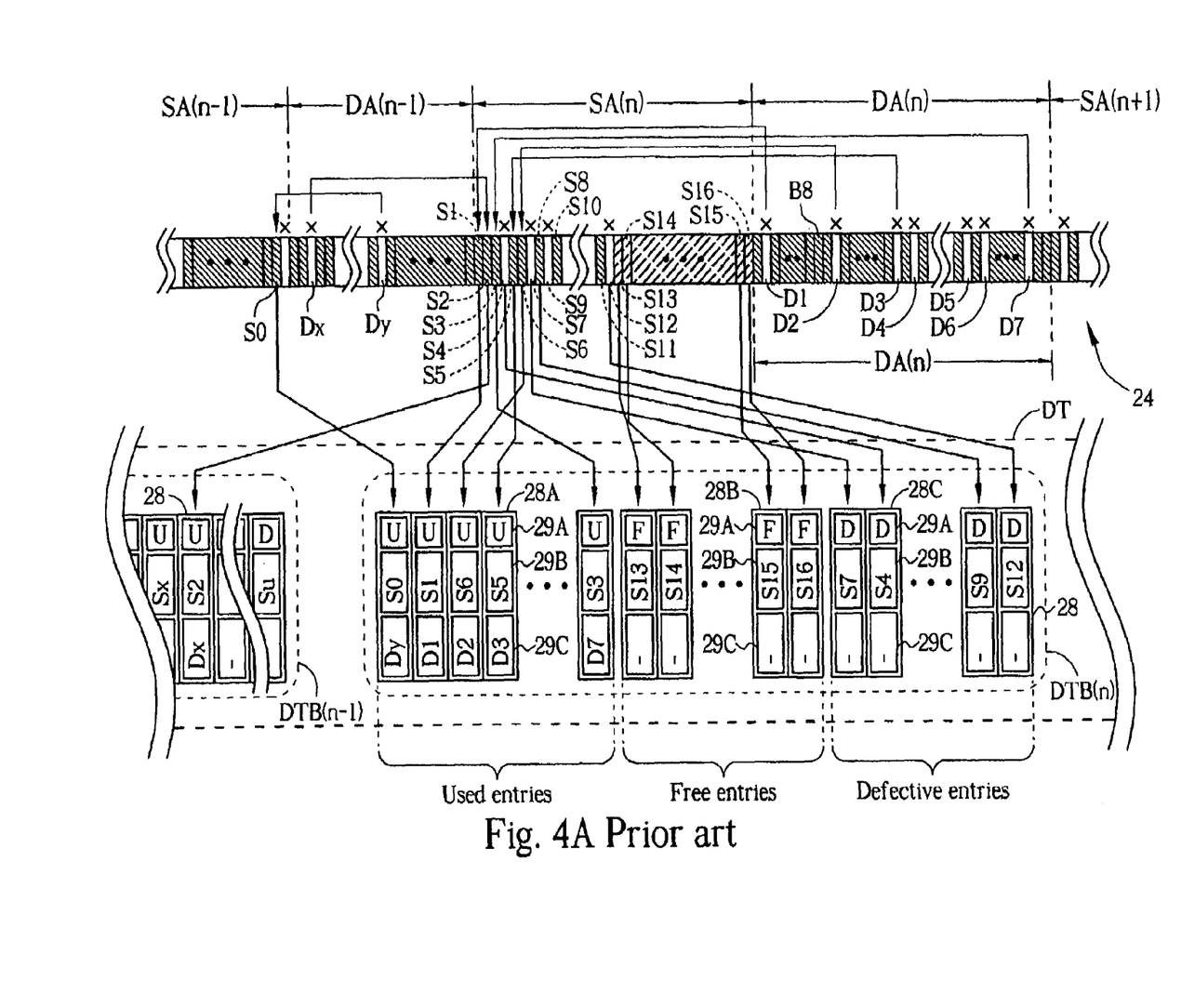
FIG. 4A is a sketch map of the detailed data structure of the defect table in FIG. 3.

Please refer to FIG. 4A. FIG. 4A is a detailed sketch map of the data structure of the defect table DT. As shown in FIG. 4A, the spare area SA(n−1) on the track 24 contains spare block S0. The spare area SA(n) has spare blocks S1 through S16. The data area DA(n−1) includes data blocks Dx through Dy. The data area DA(n) includes data blocks D1 through D7. In the defect table DT, the data block DTB(n−1) is mainly used to record the usage status of corresponding spare blocks in the spare area SA(n−1). In every entry 28 that maps to one spare block Bs records one status information 29A, one spare block Bs address information 29B, and one data block Bd address information 29C. The spare block Bs address information 29B records the spare block Bs address mapped to this entry. To facilitate further discussion, three entries are marked 28A, 28B, and 28C respectively in FIG. 4A.

For each spare block Bs on the track 24, there are three different possibilities. First, a spare block Bs is already used to substitute for a defective data block Bd and contains the data that was supposed to be written onto this defective data block Bd. Second, although the spare block Bs can record data normally, it is not yet used to substitute for a defective data block Bd. Third, the spare block is defective and cannot be used to record any data.

For example, in FIG. 4A, the spare block S0 of the spare packet SA(n−1) and the spare blocks S1, S2,S3,S5,S6,S8, S10, and S11 of the spare packet SA(n) are used as substitutes to record data originally meant for specific defective data blocks Bd. The entries 28 that were used to record the usage status of these spare blocks Bs can also be called "used entries". The spare blocks Bs that these entries map to were used to substitute for the defective data blocks Bd.

For instance, an entry 28A is used to record the usage status 29A of the spare block S5 and the address information 29B of the spare block S5. If the spare block S5 is used to substitute for a defective data block D3 for data recording, then the data block address information 29C of the entry 28A will record the address of the data block D3. Finally, the status information 29A is used to mark the entry 28A as a used entry. In FIG. 4A, a "U" is used to mark a used entry 28. In practice, the status information 29A is a 4 bit data. Similarly, the correspondences of the spare blocks S2, S0, S1, S6, S5, and S3 that are used to substitute for defective data blocks Dx, Dy (which reside in the data area DA(n−1)), D1, D2, D3, and D7 respectively, are each mapped in used entries 28A. All of the used entries 28A are gathered together and form a group in the record block DTB(n) as shown on FIG. 4A.

When the optical disc drive 10 tries to access data in a defective data block Bd on the optical disc 22, the optical disc drive 10 uses the address of this defective data block Bd to find the corresponding entry 28A that records the address 29C of this defect data block Bd. The optical disc drive 10 then uses the address 29B of the corresponding spare block Bs via this entry to use this spare block Bs to substitute for the original defective data block Bd for data accessing.

The spare blocks S13, S14 to S15, and S16 in FIG. 4A are all normal recordable spare blocks Bs, but they are not yet used to substitute for a defective data block Bd. The entries 28B recording the usage status 29A of these spare blocks Bs are called "free entries". For instance, the entry 28B of the spare block S15 is a free entry. The spare block address information 29B of the entry 28B will record the address of the spare block S15. Because the spare block Bs that maps to a free entry is not yet used to substitute for a defective data block Bd, the data block address information 29C will not record the address of a specific data block Bd. In FIG. 4A, the status information 29A is marked with an "F" to indicate that the entry 28B is a free entry. Based on the same reasoning, the status information 29A of the spare blocks S13, S14, and S16 are also marked with an "F" in the respective entries 28B. Similar to the allocation of used entries, in a record block DTB(n), all of the recordable free entries are also gathered together to form a group, as shown in FIG. 4A.

Just like the data blocks Bd can be damaged and become defective data blocks Bd, the spare blocks Bs in the spare area SA can also be damaged and become defective spare blocks Bs. For instance, in FIG. 4A, spare blocks S4, S7, S9, and S12 are defective spare blocks. Entries 28C that are used to record the usage status 29A of the spare blocks S4, S7, S9, and S12 are called unusable entries. For example, the address of the defective spare block S4 is recorded in the spare block address information 29B of the unusable entry 28C. The defective spare block S4 cannot be used to substitute for any defective data block Bd for data recording, so the data block address information 29C of the data entry 28C will not record an address of any specific data block Bd. In FIG. 4A, the status information 29A is marked "D" to indicate that the entry 28C is an unusable entry. Similarly, the defective spare blocks S7, S9, and S12 are also recorded as unusable entries. For the same record block DTB, all of the unusable entries 28C are also gathered together to form a group as shown in FIG. 4A.

From the description above, the usage status 29A of any spare block Bs is known based on the possible three entries (used, free, and unusable). In order to streamline the process of defect management, the entries of the record block DTB in the defect table DT are sorted. As described above, the data blocks Bd and the spare blocks Bs all have addresses. Every used entry 28 in the defect table is sorted into ascending order by the address of the defective block 29C.

Take FIG. 4A as an example, the defective data blocks Bd from left to right are Dx, Dy, D1, D2, and D3 to D7. The data block Dx has the lowest address value, and from left to right the value increases (Dx<Dy<D1<D2< ... <D7)with the data block D7 having the highest address value. The used entries 28A that record the addresses of these defective data blocks are also sorted by the address value order of defective data blocks Bd. As shown in FIG. 4A, in a data block DTB(n), among all the used entries 28A, the used entry 28A that records the address of the data block Dy is arranged at the left hand side of the diagram, and the order of the used entries 28A is according to the order of the addresses of the data blocks Dy, D1, D2, and D3 to D7. In practice, all the used entries 28A in the record block DTB of the defect table DT will follow the magnitude order of the defective data block address. In other words, in the record block DTB(n−1), of all the defective data block addresses recorded by the used entries 28A, the highest address is the rightmost address. In the record block DTB(n), every defective data block address recorded by the used entries 28A will be higher than the rightmost address in the record block DTB(n−1).

Compared to the order arrangement of the used entries 28A in the defect table DT, the order the free entries 28B is based on the spare block Bs addresses that the free entries 28B record. In FIG. 4A, the spare blocks Bs from left to right are S1, S2, S3 through S14, S15, and S16. The spare block S1 has the lowest address value, and from left to right the value of each address increases (S1<S2<S3< . . . <S14<S15<S16) with the spare block S16 having the highest address value. For the spare blocks S13, S14, S15, and S16 that are not used to substitute for defective data blocks Bd, the corresponding free entries 28B also follow the same order from left to right as shown in FIG. 4A. Unusable entries 28c do not require any special sorting.

When the optical disc drive 10 accesses the data block Bd in the data area DA(n) sequentially, the optical disc drive 10 encounters the defective data blocks D1, D2 and D3. If the data area DA(n)is arranged according to the address of the defective data block Bd sequence and used entries 28A are sorted as a group, the optical disc drive can retrieve the address of the substituted spare block Bs via the used entry 28A. Based on the address sequence to arrange the spare blocks Bs and the gathering of the free entries 28A, the optical disc drive 10 can find free spare blocks 28B to substitute for the defective data blocks Bd.

Figure 4B:
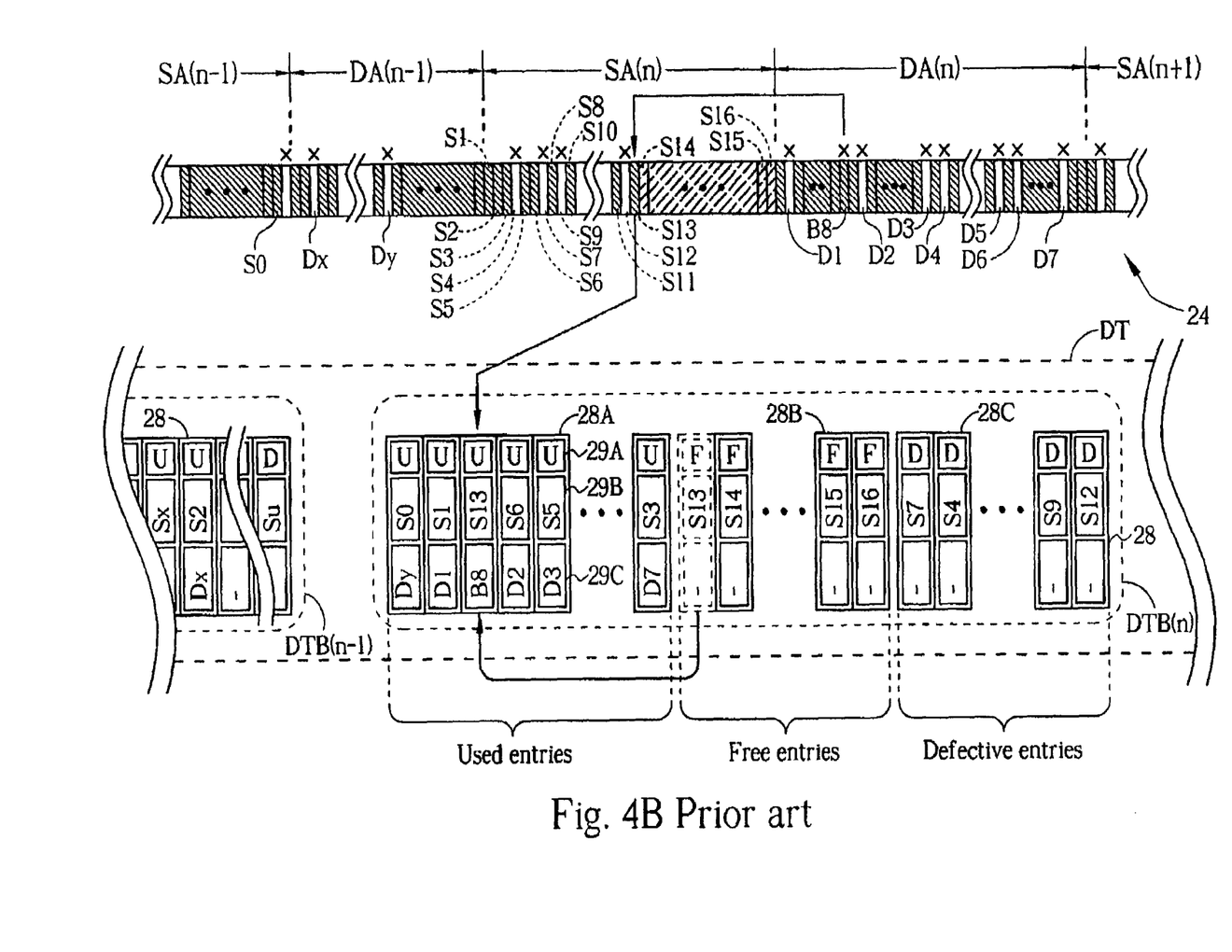
FIG. 4B shows how the defect table in FIG. 4a is updated as the status of the optical disc changes.

However, because these three types of entries (used, free, and defective) are gathered to form groups and sorted differently according to their types, the number and position of all the entries 28 in the defect table DT will change with repeated data accessing. Please refer to FIG. 4B (and also FIG. 4A). FIG. 4B shows, if the optical disc 22 status changes, how the defect table from FIG. 4A is affected. Suppose during the operation of data writing, the optical disc drive 10 finds a normal data block B8 on track 24 has become defective (in other words, the data block B8 is normal in FIG. 4A but is defect in FIG. 4B). The optical disc drive 10 can no longer write data to the data block B8. Following the defect management principles mentioned earlier, the optical disc drive 10 searches for a free entry 28B in the defect table DT to find a free spare block 28A (not used as a substituted block for any defective data block)and locates the spare block S13. Then the spare block S13 is used to substitute for the defect data block D8.

After the usage status 29A of the free entry 28B for the spare block S13 is changed from "free" to "used", the free entry 28B that records the address of the spare block S13 in the record block DTB(n) will be a used entry. The changed status information 29A from an "F" to a "U" makes the free entry 28B become a "New" used entry 28A. Of course, now there is one less free entry in FIG. 4B than in FIG. 4A.

As described above, the used entries 28A need to be sorted. Because the address value of the data block B8 is somewhere between the defective data blocks D1 and D2 the "New" used entry 28A has to be put in between the two used entries 28A that record the defective blocks D1 and D2. From this example it can be seen that the order of the used entries 28A after sorting may be different from the corresponding spare block Bs sequence arranged on the track 24.

Furthermore, as shown by FIGS. 4A and 4B, if there are more defective data blocks Bd in the data area DA(n−1) than the normal spare blocks Bs in the spare area SA(n−1), the spare blocks Bs in the spare area SA(n) are used. When the used entries 28A are sorted according to the defective data block Bd addresses, the used entry 28A that records the spare block S2 originally in the spare are SA(n) might be placed in the record block DTB(n−1) that normally maps to the spare area SA(n−1). Similarly, for the spare block S0 that belongs to the spare area SA(n−1), the used entry 28A might be moved to the record block DTB(n). In response to the "New" used entry 28A, the defect table DT with changed content will be rewritten onto the optical disc 22. Afterwards, when the optical disc 10 is accessing data and encounters the defective data block B8, from the updated defect table DT it can locate the corresponding spare block S13.

From the discussion above, after repeated data accessing, the optical disc 22 will eventually have defects. The entry number and sequence of the defect table DT will keep changing too. Because the used entries 28A and the free entries 28B are grouped and sorted within their respective groups, the entries 28 used to record the usage status 29A of the spare blocks Bs can no longer be arranged sequentially according to the spare blocks Bs sequence on the track 24. For instance, as mentioned in FIGS. 4A, 4B, even with the spare blocks S12, S13, and S14 on neighboring positions on track 24, the entries 28 used to record the usage status 29A of the spare blocks S12, S13, and S14 will not lineup in neighboring positions and follow the sequence of the spare blocks S12, S13 and S14.

Even within the used entries 28A of every record block DTB, the spare blocks Bs with neighboring entry 28 records are not necessary the neighboring spare blocks Bs on the track 24. In other words, the defect table DT based on the spare block usage status 29A cannot reflect the actual sequence of the spare blocks Bs on the track 24.

If the address of the spare block Bs is needed to refer to the usage status 29A of this spare block Bs, the spare block Bs address information 29B of each spare block Bs in the defect table DT must be checked one by one to retrieve the status of this spare block Bs via the status information 29A from the entry 28. For instance, if the optical disc drive 10 encounters one defective spare block Bs in some spare area SA during optical disc 22 data accessing, the spare block Bs address information 29B of all the unusable entries 28C is checked one by one to find out if this spare block Bs is already recorded in the defect table DT as a defective spare block Bs. If this spare block Bs is not recorded as a defective spare block Bs yet, this spare block Bs might be recorded as a spare block Bs in a free entry 28B. Now the usage status 29A of the entry 28B must be changed accordingly. Because there is no way to directly retrieve the usage status 29A of the spare block Bs simply by address, the process of defect management is cumbersome and slow.

SUMMARY OF INVENTION

The primary objective of the claimed invention is to disclose a method that can manage the usage status of spare blocks efficiently, and to directly control the usage status of spare blocks according to the address of the spare block.

The claimed invention sets up a status table in addition to a defect table. The status table has a plurality of fields with each field mapping to one spare block on the optical disc and is used to record the usage status of that particular spare block. All fields in the status table are arranged in the same order as the spare blocks they map to on the optical disc. After the construction of the status table according to the claimed invention, the defect distribution density and related statistic data in different data areas and spare areas is easily available, further assisting data accessing on the optical disc.

DETAILED DESCRIPTION

Figure 5:
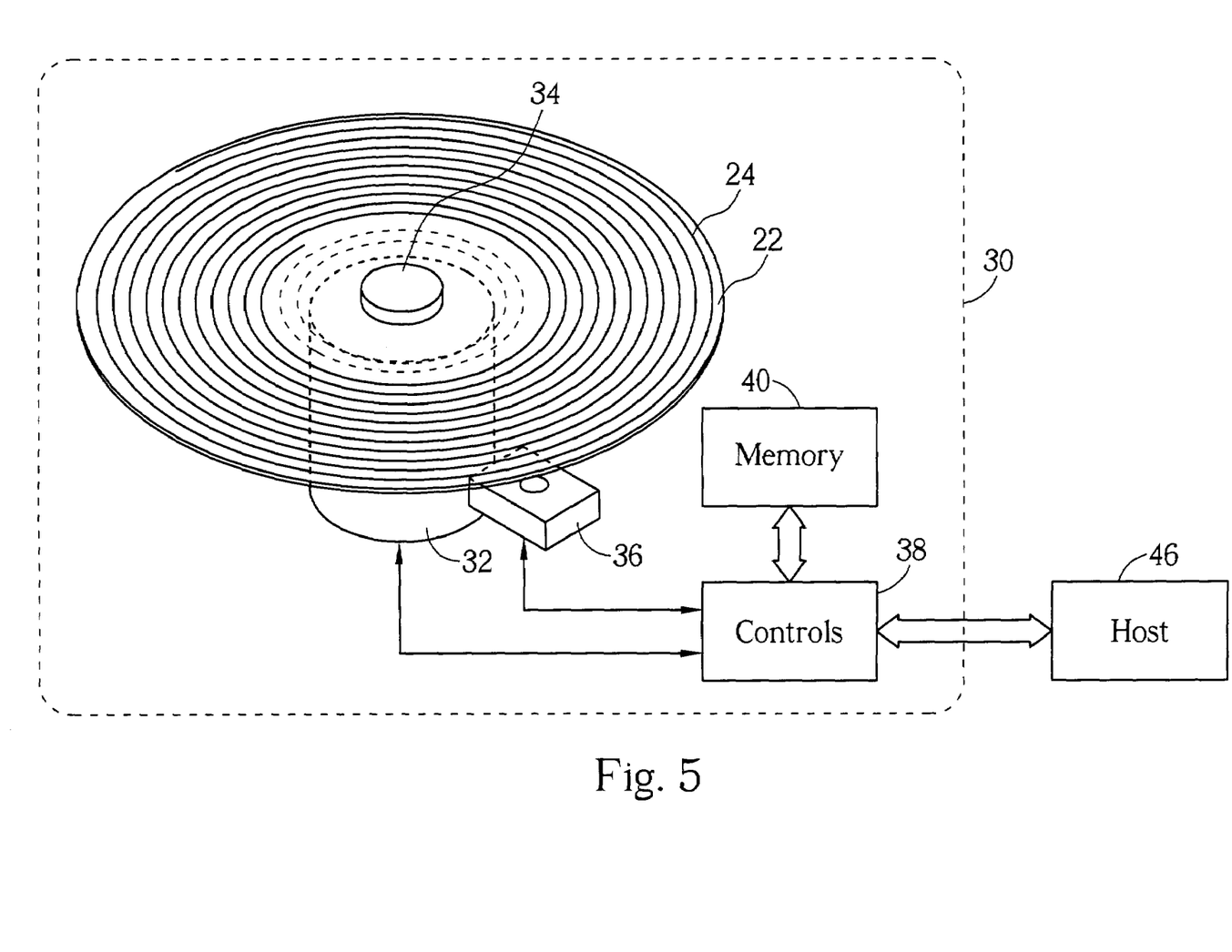
FIG. 5 is a functional block diagram of an optical disc drive according to the present invention.

Please refer to FIG. 5. FIG. 5 is a functional block diagram of a present invention optical disc drive 30 with a host 46. The method of the present invention can be used with the optical disc drive 30 of FIG. 5. With the host 46 (can be a computer system such as a PC), users can control the optical disc drive 30 to access data on an optical disc 22. There is a loader 34 in the optical disc drive 30, one motor 32 that spins the loader 34, a control circuit 38 that controls the operation of the optical disc drive 30, and a memory 40 (for instance, random access memory) to temporarily hold the data needed for the control circuit 38 during an operational period. When the motor 32 drives the loader 34, the optical disc 22 on the loader 34 rotates and tracks 24 on the optical disc 22 that are used for recording data will sweep across a pick-up head 36. The pick-up head 36 then accesses the data on the tracks 24. The data protocol recorded on the track 24 can be of the CD-MRW specification shown in FIG. 2.

To control the usage status of all the spare blocks more efficiently, in addition to an original defect table on the optical disc 22, the present invention adds a status table to record the usage status of all spare blocks according to their sequence order on the track 24. The status table is kept in the memory 40 for use by the control circuit 38 and is not necessarily written to the optical disc 22 to retain compatibility with the CD-MRW protocol.

Figure 6:
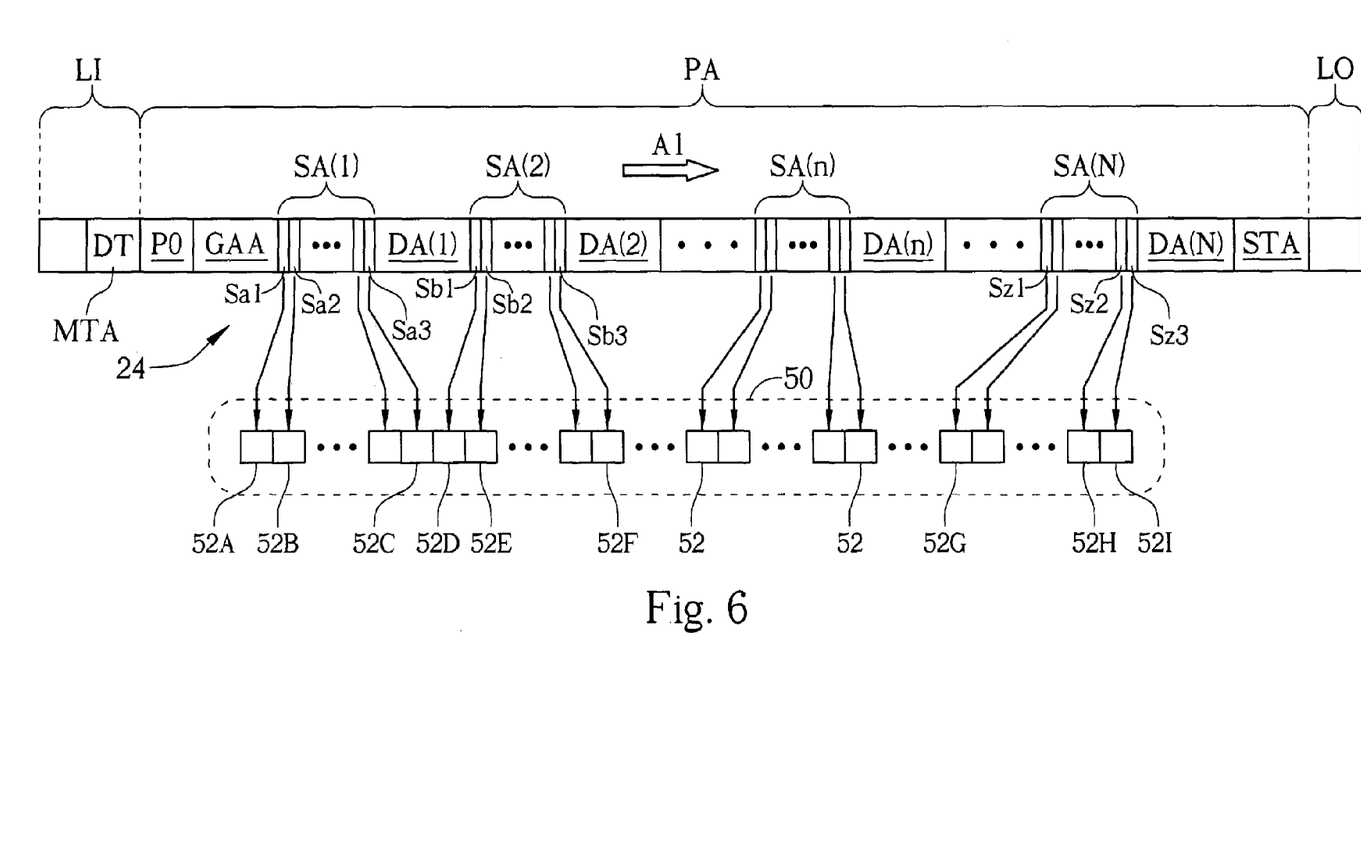
FIG. 6 is a sketch map of main data structure in a status table according to the present invention.

Please refer to FIG. 6. FIG. 6 is a sketch map that shows the data structure of the status table 50 of the present invention mapping with the spare blocks Bs on the optical disc track 24. In the status table 50 of the present invention, there are a plurality of fields 52 (for easier discussion in the future, nine fields are marked 52A to 52I), every field maps to a spare block Bs on the track 24 and records the usage status of that spare block Bs. Most importantly, in the present invention, the fields 52 that map to the spare blocks Bs correspond to the order of the spare blocks Bs on the track 24 and lineup accordingly in the status table 50. As shown in FIG. 6, from left to right in the diagram, fields 52A, 52B, and 52C in the status table 50 map to spare blocks Sa1, Sa2, and Sa3 in spare area SA(1) using the same order. The fields 52A and 52B map to the neighboring spare blocks Sa1 and Sa2, so they are also in neighboring positions in the status table 50. Fields 52D, 52E, and 52F map to spare blocks Sb1, Sb2, and Sb3 in spare area SA(2) respectively and lineup in the status table 50 in the same order as the spare blocks Sb1, Sb2, and Sb3. The field 52C that maps to the last spare block Sa3 in the spare area SA(1)(the one at the left) will also neighbor the field 52D that maps to the first spare block Sb1 of the spare area SA(2).

The same rule applies to the last spare area SA(N) of track 24, fields 52G, 52H, and 52I map to data blocks Sz1, Sz2, and Sz3 and lineup at the last part of the status table 50. Compared to the first field 52A in the status table 50 (maps to the first spare block Sa1 in the first spare area SA(1)), the last field 52I in the status table 50 maps to the last spare block Sz3 on the track 24.

Figure 7A:
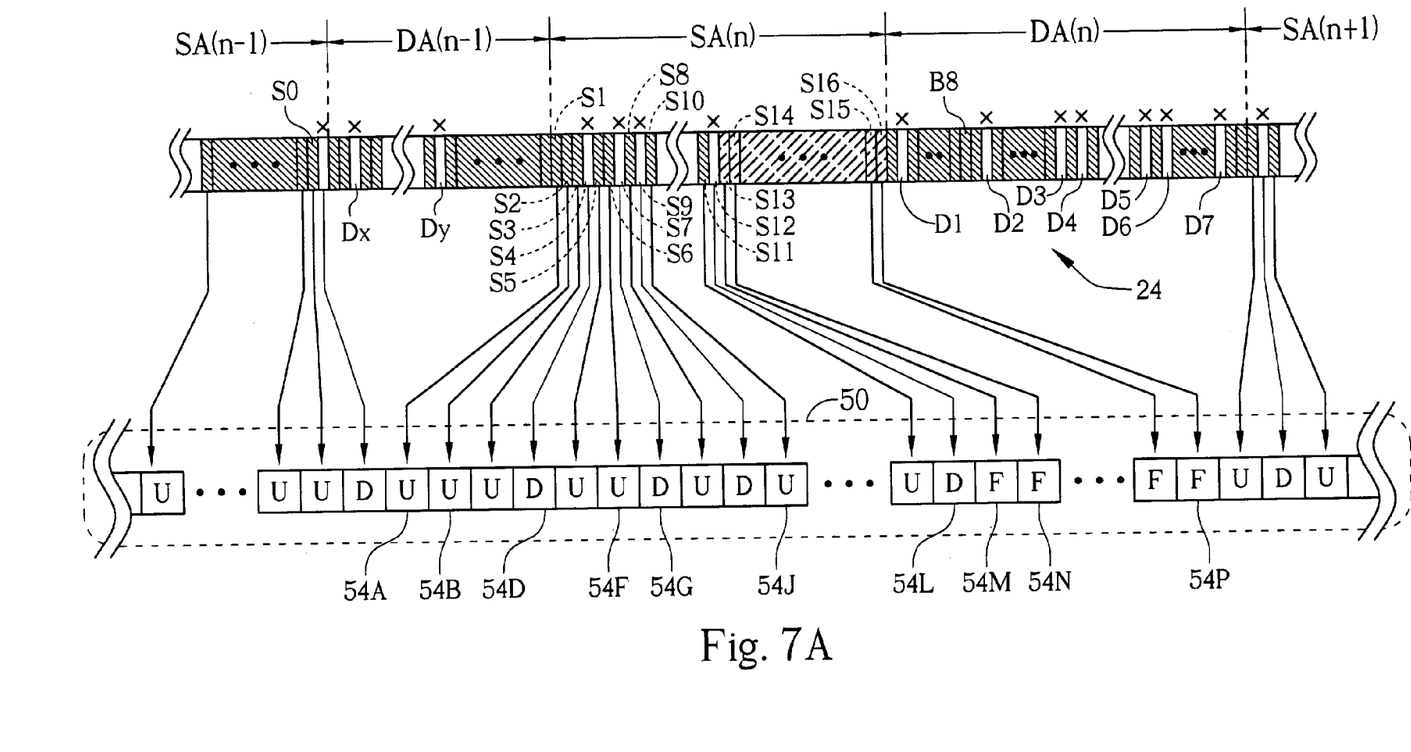
FIG. 7A is a sketch map of the main data structures in the status table of FIG. 6.

For further notes on the implementation of the present invention, please refer to FIG. 7A. For easier comparison of the data structures between the status table 50 of the present invention and the defect table DT, FIG. 7A is a sketch map to show how the status table 50 of the present invention is used to record the usage status of the spare blocks Bs in FIG. 4A. In a preferred embodiment of the present invention, the field 52 that maps to one spare block Bs will record whether this spare block Bs is free, is used to substitute for a defective data block Bd, or if the spare block Bs is defective.

For instance, the spare block S1 is used to substitute for one defective data block Bd. A field 54A that maps to the spare block S1 records that the spare block S1 is a used spare block Bs. Similarly to the example in FIG. 4A, FIG. 7A also uses a "U" in the field to show that the spare block S1 is already used to substitute for a defective data block Bd. Similarly, a field 54B to the right of the field 54A maps to a spare block S2 and records that the spare block S2 is already used to replace a defective data block Bd.

On the other hand, a field 54D in the status table 50 that maps to a defective spare block S4 records that the spare block S4 is a defective spare block Bs and cannot record data. The fields 54 in FIG. 7A use a "D" to represent a defective spare block Bs. Similarly, a field 54G that maps to a spare block S7 is also marked with "D", indicating that it is also a defective spare block Bs.

Finally, in FIG. 7A, all the fields 54 that map to a free spare block Bs (spare blocks Bs that are not defective and are not used to substitute any defective data block Bs yet) will have an "F" in the field representing that the spare block Bs that the field 54 maps to is a free spare block Bs. For instance, fields 54M, 54N, and 54P in the status table 50 record that the spare blocks S13, S14, and S16 are all free spare blocks Bs.

Figure 7B:
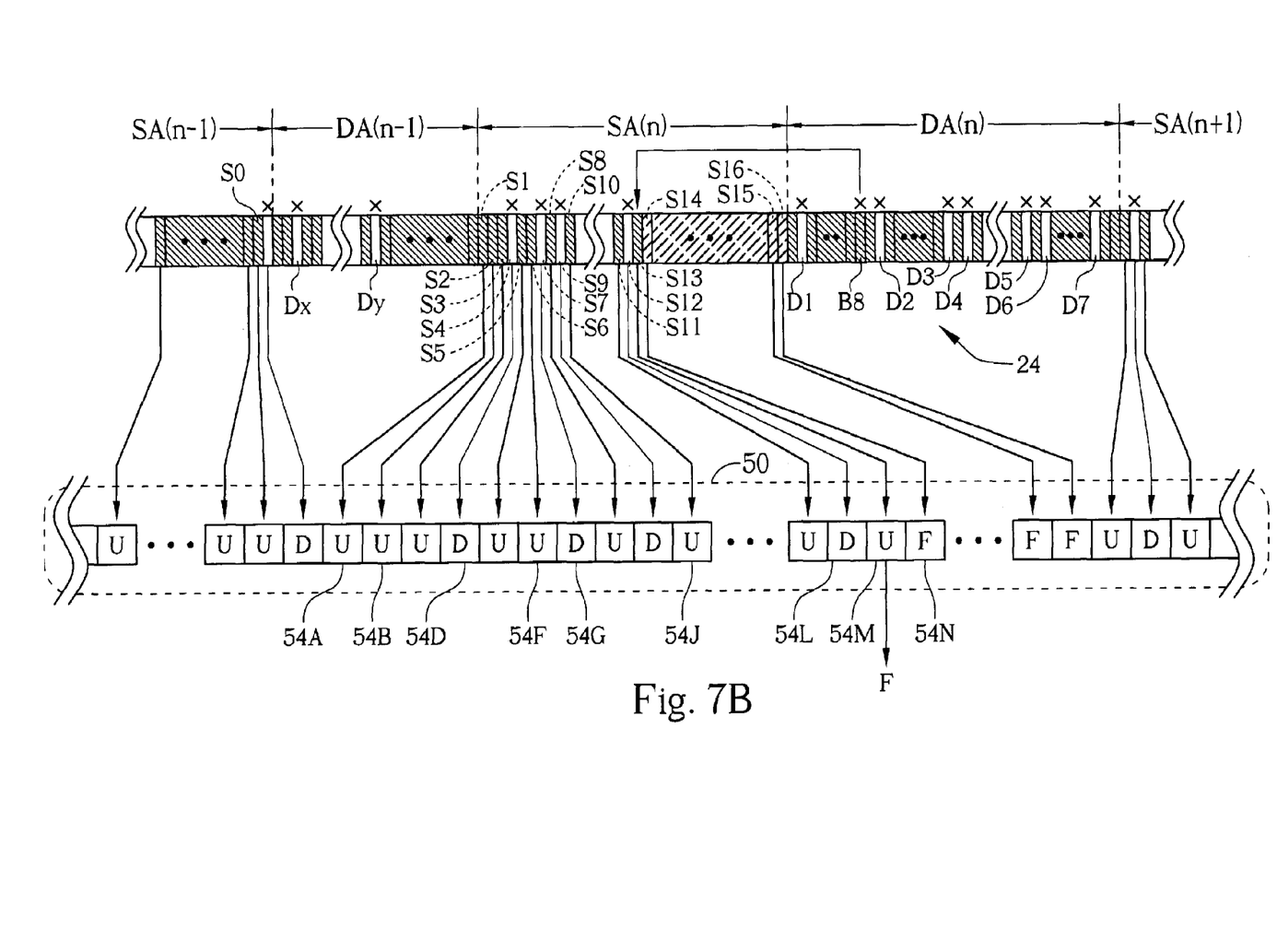
FIG. 7B shows how a defect table is updated as the status of an optical disc changes according to the present invention.

Please refer to FIG. 7B (and also FIG. 7A). As with the discussion of FIG. 4A and FIG. 4B above, during the process of data accessing on the optical disc 22, the usage status of every spare block Bs might change. The status table 50 of the present invention will be able to update the status change of every spare block Bs. For example, in the transformation of FIG. 4A into FIG. 4B, a data block B8 in FIG. 7A used to be functional, but during the process of data accessing on the optical disc 22, the data block B8 became a defective data block and cannot record data anymore. When the optical disc drive 30 tries to write data into the data block B8, the optical disc drive 30 discovers that the data block B8 is defective and will look for a substitute spare block Bs. If the optical disc drive 30 decides to substitute spare block S13 for the data block B8, the usage status of the spare block S13 will change from "free" to "used". FIG. 7B shows a sketch map for the status table 50 mapping update.

Because the spare block S13 maps to a field 54M in the status table 50, the field 54M was previously marked with an "F" in FIG. 7A (to indicate that the spare block S13 is free).

After the spare block S13 in FIG. 7B is used to substitute for the data block B8, the field 54M in the status table 50 is changed into a "U", indicating that the spare block S13 that the field 54M maps to is now used to substitute for a defective data block Bd.

Even with the change of usage status of the spare block S13, the spare block S13 still maps to the field 54M in the status table 50. Regardless if in FIG. 7A or FIG. 7B, the neighbors of the field 54M are still fields 54L and 54N, they still map to the spare blocks S12 and S14 which are neighbors of the spare block S13. In other words, even with usage status changes of every spare block Bs, the order of their corresponding fields in the status table 50 is still the same as the order of the spare blocks Bs on the track 24.

In practice, in the preferred embodiments of the status table 50 of the present invention, every field 54 can be a one byte (8 bits) data, 2 bits can be used to record the usage status of the spare block Bs (total 3 status, "U", "D" and "F" in FIG. 7A) and the remaining 6 bits can be reserved for other related data. For instance, the address of the substituted defective data block Bs can be recorded in the mapping field 54 of the used spare block Bs. In other words, in the field 54 that maps to a spare block Bs, in addition to recording the usage status of that spare block Bs as used, free, or unusable (defective), the field 54 can also record other related data of that spare block Bs. Under the circumstance that every field 54 is one byte of data, if there are M spare blocks Bs on the track 24, the status table 50 of the present invention will be M bytes of data.

When the optical disc drive 30 (refer to FIG. 5) starts to access data on the optical disc 22, the control circuit 38 of the optical disc drive 30 will first read the defect table DT of the optical disc 22 into the memory 40. In the mean time, the control circuit 38 will construct the status table 50 of the present invention based on the defect table DT in the memory 40. For instance, M bytes of the memory 40 is allocated to store the status table 50, then every field 54 in the status table 50 is filled out based on the content of every entry 28 in the defect table DT.

In practice, the control circuit 38 can execute a simple program (or use a simple logic circuit) to calculate which byte (field 54) of the status table 50 a spare block Bs is mapped to according to the address of the spare block Bs, allowing access to the information in the field 54 in the status table 50. When the optical disc drive 30 starts to access data on the optical disc 22, from the status table 50 the optical disc drive 30 can find the mapping field 54 according to the spare block Bs address, and can access the data within this field 54. For instance, when the optical disc drive 30 encounters a defective spare block Bs on the optical disc 22 during data accessing, the control circuit 38 determines whether this defective spare block Bs is marked "unusable" in the status table 50 by the address of this defective spare block Bs. In comparison to the prior art, the optical disc drive 10 has to check every unusable entry in defect table one by one to know whether that defective spare block Bs is marked as defective (unusable) already.

As the examples shown in FIGS. 7A, 7B (and FIGS. 4A, 4B) demonstrate, in response to events occurring during a data accessing period of the optical disc 22, the optical disc drive 30 has to update the content of defect table DT and the status table 50 accordingly. Normally, after the optical disc drive 30 reads the defect table DT and stores it temporarily in the memory 40, whenever the defect table DT needs to be updated, the optical disc drive 30 will only update the defect table DT in the memory 40. Updating the status table 50 is also a fast memory operation.

After the optical disc drive 30 finishes accessing data on the optical disc 22 (for instance, the optical disc 22 is to be ejected from the optical disc drive 30), the optical disc drive 30 will then write back the updated defect table DT in the memory 40 to the optical disc 22 (writes to the main table area MTA/secondary table area STA, as shown in FIG. 2). Of course, in one embodiment of the present invention, the status table 50 of the present invention can also be written into one fixed location on the optical disc track 24. That is, if the status table 50 of the present invention has been recorded onto the optical disc 22 in a prior session, before the optical disc drive 30 starts to access the optical disc 22, the optical disc drive 30 can load the status table 50 from the optical disc 22 into the memory 40 and update the temporary status table 50 in the memory 40 during as needed. If the status table 50 is changed during a session, before finishing the optical disc 22 data accessing, the updated status table 50 will be written back onto the optical disc 22.

With the prior art, only the defect table DT is used to record the usage status 29A of every spare block Bs. Because the defect table DT categorizes every spare block Bs by its individual usage status 29A, it is impossible to quickly determine the usage status 29A of the spare block Bs simply by using the address of the spare block Bs.

The status table 50 of the present invention acts as an accessory tool for the defect table DT and records the usage status 29A of every spare block Bs in the order of the spare blocks Bs on the optical disc track 24. The usage status 29A of the spare block Bs can be retrieved according to the address of the spare block Bs, resulting in a more efficient defect management mechanism.

Additionally, from the status table 50 of the present invention, calculating the number of defective blocks and related statistic data of the optical disc 22 is quick and it can be used as the basis for optical disc 22 data accessing. For instance, the number of defective data blocks on the optical disc 22 (based on the number of used spare block) can quickly be calculated from the status table 50 before the optical disc drive 30 accesses data. For an optical disc 22 with fewer defective data blocks Bd, the default spin speed of the optical disc drive 30 can be faster allowing the optical disc drive 30 to access data on the optical disc 22 at a higher speed. Contrarily, if the optical disc 22 has more defective data blocks Bs, the optical disc drive 30 will perform more frequent defect management functions (such as moving the pick-up head to a spare area SA and accessing the data on the spare blocks Bs). In this case, the default speed of optical disc drive 30 can be lower, so that the optical disc drive 30 can perform more frequent defect management processing at a slower speed.

Furthermore, from the status table 50 of the present invention, the distribution status of the used spare block Bs can be calculated. If most of the spare blocks Bs in some spare area SA are used spare blocks Bs, the optical disc drive 30 can also read these spare blocks into the memory 40. Because later on during the data accessing process of the optical disc 22, the optical disc 22 is very likely to access these spare blocks Bs to perform a defect management function. If these spare data blocks Bs are read into the memory 40 beforehand, the pick-up head needs not move on the track 24 to access these spare blocks Bs. In conclusion, by using the status table 50 of the present invention, the inadequateness of the defect table is overcome and the processes of optical disc data accessing and defect management are more efficient.

Described above is only the preferred embodiments of the present invention. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for managing data of an optical disc, the optical disc having a plurality of areas, each area having a plurality of data blocks and a plurality of spare blocks arranged in order, each of the data blocks being used to record data, and each of the spare blocks being capable of replacing a corresponding defective data block to record data, the method comprising:

establishing a status table, wherein the status table comprises a plurality of columns arranged in order, and each of the columns is used to record a status of a corresponding spare block; and recording the statuses of the spare blocks in the status table according to the arranging order of the spare blocks;

wherein, within the status table, a first column recording a status of a last spare block in a first area always neighbors a second column recording a status of a first spare block in a next area.

2. The method of claim 1 wherein when recording statuses of a first spare block, of a second spare block, and of a third spare block in a first column, a second column, and a third column of the status table, respectively, if the second column is located between the first column and the third column, the status of the first spare block is the same as the status of the third spare block, and there is not any data block located between the first spare block and the third spare block, a changed status of the second spare block is recorded in one of the columns being located between the first column and the third column.

3. The method of claim 1 wherein it can be determined whether each of the spare blocks are defective according to the data recorded in the columns.

4. The method of claim 1 wherein it can be determined whether each of the spare blocks have been used to replace a corresponding defective data block according to the data recorded in the columns.

5. The method of claim 1 for an optical disc drive wherein the optical disc drive comprises a memory for storing the status table while the status table is established.

6. The method of claim 1 wherein if there is a defective second spare block located between a first spare block and a third spare block, the first spare block and the third spare block are not defective, and there is not any data block located between the first spare block and the third spare block, when recording the statuses of the first, second, and third spare blocks in the status table, the statuses of the first spare block, of the second spare block, and of the third spare block are respectively recorded in a first column, a second column, and a third column, wherein the second column is located between the first column and the third column.

7. The method of claim 1 further comprising including other related data in each column of the status table.

8. The method of claim 7 further comprising including an address of a substituted defective data block in a mapping field of the status table for columns having a used status of corresponding spare blocks.

9. The method of claim 1 being for an optical disc drive, the method further comprising:

providing a memory installed in the optical disc drive;

reading a defect table from the optical disc into the memory of the optical disc drive; and establishing the status table according to the defect table in the memory.

10. The method of claim 1 further comprising reading the status table from the optical disc.

11. The method of claim 1 further comprising writing the status table to the optical disc if the status table is changed during a session.

12. The method of claim 11 further comprising writing the status table to a predetermined location on the optical disc.

* * * * *